(12) United States Patent
Lyu (10) Patent No.: US 10,243,643 B2
(45) Date of Patent: Mar. 26, 2019

(54) BEAM ADJUSTMENT APPARATUS AND METHOD FOR ARRAY ANTENNA (71) Applicant: Huawei Technologies Co., Ltd., Shenzhen (CN)

(72) Inventor: Rui Lyu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/640,172

(22) Filed: Jun. 30, 2017

(65) Prior Publication Data

US 2017/0302357 A1 Oct. 19, 2017

Related U.S. Application Data

(63) Continuation of application No. PCT/CN2014/095958, filed on Dec. 31, 2014.

(51) Int. Cl.
*H04B 7/08* (2006.01)
*H04B 7/06* (2006.01)
(Continued)

(52) U.S. Cl.
CPC .............. *H04B 7/086* (2013.01); *H01Q 3/28* (2013.01); *H01Q 3/34* (2013.01); *H04B 7/06* (2013.01); *H04B 7/0617* (2013.01); *H04B 7/08* (2013.01)

(58) Field of Classification Search
CPC ........ H04B 7/086; H04B 7/0617; H01Q 3/28; H01Q 3/34
See application file for complete search history.

(56) References Cited

U.S. PATENT DOCUMENTS 7,702,000 B1 4/2010 Wang et al.
8,743,914 B1 6/2014 Jensen
(Continued)

FOREIGN PATENT DOCUMENTS

CN 1549473 A 11/2004
CN 101931449 A 12/2010
(Continued)

OTHER PUBLICATIONS

Zhou-Wei et al., "Compressed Sensing in Array Signal Processing Based on Modulated Wideband Converter," 2014 XXXIth URSI General Assembly and Scientific Symposium (URSI GASS), XP032662987, Institute of Electrical and Electronics Engineers, New York, New York (Aug. 16-23, 2014).

*Primary Examiner* — Jean B Corrielus
(74) *Attorney, Agent, or Firm* — Leydig, Voit & Mayer, Ltd.

(57) ABSTRACT

The embodiments of the present invention provide an array antenna beam adjustment device; before combining and analog-digital conversion, the array antenna beam adjustment device couples an N-way reception signal, and performs low-speed small-bandwidth analog-digital conversion on the N-way reception signal; according to the analog-digital converted signal, spatial filtering is performed and a filtering coefficient is adjusted; according to the filtering coefficient, the weight of the reception signal is adjusted, and thus the reception beam is adjusted. In the embodiments of the present invention, beam control is carried out according to the N-way reception signal, and the speed and flexibility of the beam control are greatly improved.

17 Claims, 3 Drawing Sheets

(51) Int. Cl.
*H01Q 3/28* (2006.01)
*H01Q 3/34* (2006.01)

(56) References Cited

U.S. PATENT DOCUMENTS

| | | | | |
|---|---|---|---|---|
| 2002/0054621 | A1* | 5/2002 | Kyeong | ............... H04B 7/01 |
| | | | | 375/147 |
| 2003/0210670 | A1* | 11/2003 | Kisigami | ............... G01S 3/74 |
| | | | | 370/335 |
| 2005/0185703 | A1* | 8/2005 | Tsutsui | ............... H01Q 21/08 |
| | | | | 375/150 |
| 2009/0161772 | A1* | 6/2009 | Sawahashi | ......... H04B 7/0617 |
| | | | | 375/260 |
| 2011/0032150 | A1 | 2/2011 | Park et al. | |
| 2013/0301454 | A1 | 11/2013 | Seol et al. | |

FOREIGN PATENT DOCUMENTS

| | | |
|---|---|---|
| CN | 102026362 A | 4/2011 |
| EP | 1819041 A1 | 8/2007 |

\* cited by examiner

BEAM ADJUSTMENT APPARATUS AND METHOD FOR ARRAY ANTENNA

CROSS-REFERENCE TO RELATED APPLICATIONS

This application is a continuation of International Application No. PCT/CN2014/095958, filed on Dec. 31, 2014, the disclosure of which is hereby incorporated by reference in its entirety.

TECHNICAL FIELD

Embodiments of the present invention relate to the field of communications technologies, and in particular, to a beam adjustment apparatus and method for an array antenna.

BACKGROUND

A microwave communications system having a beam forming function can dynamically adjust a direction or a shape of an antenna beam by changing phases or gains of multiple signals in an array antenna, to automatically adapt to changes in environment and interference on a link, so that the microwave communications system has extremely great flexibility and extremely low maintenance costs.

In the conventional art, a beam control unit controls and determines a beam according to a combined signal, and a speed and flexibility of the beam control are both not ideal.

SUMMARY

Embodiments of the present invention provide a beam adjustment apparatus and method for an array antenna, which are used to flexibly adjust a beam of an array antenna.

According to a first aspect, an embodiment of the present invention provides a beam adjustment apparatus for an array antenna, where the array antenna includes N receive array elements, and the adjustment apparatus includes a receive weight adjuster, a combiner, an analog-to-digital conversion and baseband processor, N anti-aliasing filters, N low-rate analog-to-digital converters, a spatial filter, a signal optimizer, and a receive weight decision device, where the receive weight adjuster is configured to receive N received signals from the N receive array elements, and perform receive weight adjustment on the N received signals according to a receive weight adjustment coefficient, to obtain N received signals after the receive weight adjustment;

the combiner is configured to receive the N received signals obtained after the receive weight adjustment, and combine the N received signals obtained after the receive weight adjustment, to obtain a combined received signal;

the analog-to-digital conversion and baseband processor is configured to receive the combined received signal, and perform analog-to-digital conversion and baseband processing on the combined received signal;

the N anti-aliasing filters are configured to separately receive one signal that is coupled from each of the N received signals obtained after the receive weight adjustment, and separately perform anti-aliasing processing on the N coupled signals, to obtain N signals after the anti-aliasing processing;

the N low-rate analog-to-digital converters are configured to separately receive the N signals obtained after the anti-aliasing processing, and separately perform low-rate analog-to-digital conversion, to obtain N digital signals;

the spatial filter is configured to receive the N digital signals, and perform spatial filtering on the N digital signals according to a spatial filtering coefficient, to obtain N signals after the spatial filtering;

the signal optimizer is configured to receive the N signals obtained after the spatial filtering, obtain an adjustment coefficient of the spatial filtering coefficient according to the N signals obtained after the spatial filtering, and send the adjustment coefficient of the spatial filtering coefficient to the spatial filter; and the receive weight decision device is configured to receive the spatial filtering coefficient, determine the receive weight adjustment coefficient according to the spatial filtering coefficient, and send the receive weight adjustment coefficient to the receive weight adjuster.

According to a second aspect, an embodiment of the present invention provides a beam adjustment method for an array antenna, where the array antenna includes N receive array elements, and the method includes:

receiving N received signals from the N receive array elements;

separately performing receive weight adjustment on the N received signals according to a receive weight adjustment coefficient, to obtain N received signals after the receive weight adjustment, combining the N received signals obtained after the receive weight adjustment, to obtain a combined received signal, and performing analog-to-digital conversion and baseband processing on the combined received signal;

separately coupling one signal from the N received signals obtained after the receive weight adjustment, to obtain N coupled signals;

separately performing anti-aliasing filtering processing on the N coupled signals, to obtain N signals after the anti-aliasing processing;

separately performing low-rate analog-to-digital conversion on the N signals obtained after the anti-aliasing processing, to obtain N digital signals;

performing spatial filtering on the N digital signals according to a spatial filtering coefficient, to obtain N signals after the spatial filtering;

obtaining an adjustment coefficient of the spatial filtering coefficient according to the N signals obtained after the spatial filtering; and determining the receive weight adjustment coefficient according to the spatial filtering coefficient.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
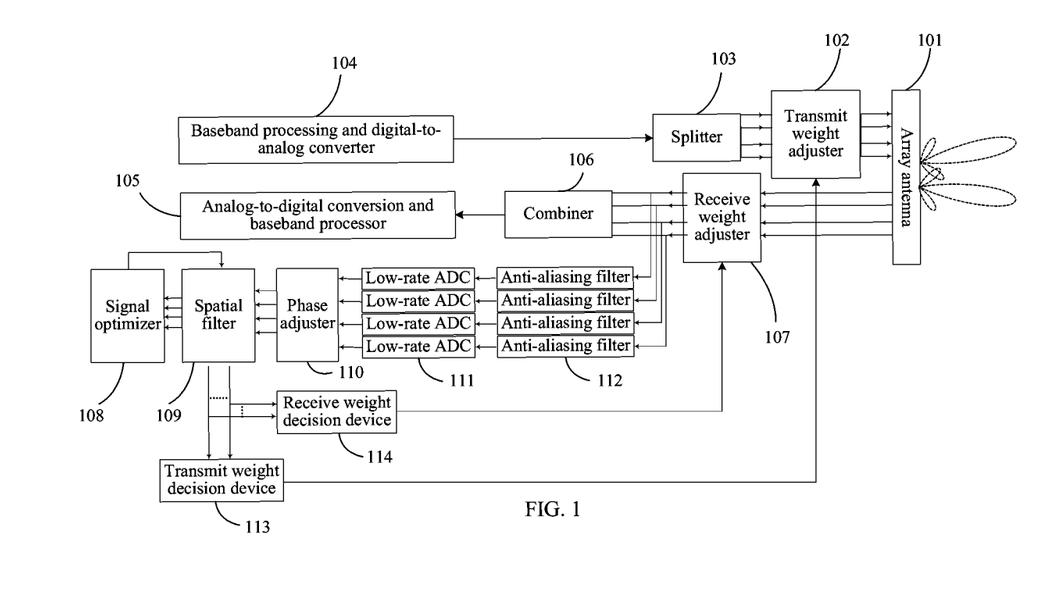
FIG. 1 is a structural diagram of a beam adjustment apparatus for an array antenna according to an embodiment of the present invention.

FIG. 1 is a structural diagram of a beam adjustment apparatus for an array antenna according to an embodiment of the present invention. The beam adjustment apparatus for an array antenna includes an array antenna 101, a receive weight adjuster 107, a combiner 106, an analog-to-digital conversion and baseband processor 105, N anti-aliasing filters 112 (AAF), N low-rate analog-to-digital converters 111 (LowRate ADC), a sampling phase adjuster 110, a spatial filter 109, a signal optimizer 108, a receive weight decision device 114, and a transmit weight decision device 113, and further includes a baseband processing and digital-to-analog converter 104, a splitter 103, and a transmit weight adjuster 102. A connection relationship is that the array antenna 101 is connected to the receive weight adjuster 107, the receive weight adjuster 107 is connected to the combiner 106, the combiner 106 is connected to the analog-to-digital conversion and baseband processor 105, the N anti-aliasing filters 112 separately receive N signals that are previously coupled by the combiner 106, the N low-rate analog-to-digital converters 111 are separately connected to the N anti-aliasing filters 112, the sampling phase adjuster 110 is connected to the N low-rate analog-to-digital converters 111, the spatial filter 109 is connected to the sampling phase adjuster 110, the signal optimizer 108 is connected to the spatial filter 109, the receive weight decision device 114 is connected to the spatial filter 109, the receive weight decision device 114 is connected to the receive weight adjuster 107, the transmit weight decision device 113 is connected to the spatial filter 109, and the transmit weight decision device 113 is connected to the transmit weight adjuster 102; in addition, the splitter 103 is connected to the baseband processing and digital-to-analog converter 104, the transmit weight adjuster 102 is connected to the splitter 103, and the array antenna 101 is connected to the transmit weight adjuster 102. The foregoing is merely an exemplary structure and connection relationship, which is not limited in this embodiment of the present invention. Some components may not be included, for example, the transmitting part may not be included; therefore, the transmit weight adjuster and the like may not be included. Certainly, another component may also be included between the components, for example, some other components that perform some simple processing, for example, shaping, on a received signal may be included between the receive weight adjuster 107 and the array antenna 101, which is not limited in this embodiment of the present invention.

For the convenience of understanding, a working manner and a working principle of the components in FIG. 1 are described below. Certainly, the components may use other working manners and working principles, as long as requirements can be met.

Figure 2:
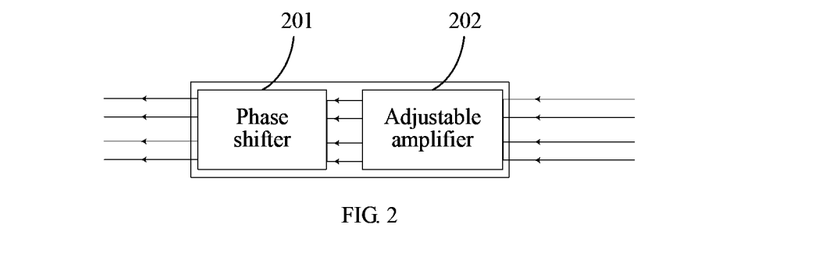
FIG. 2 is a structural diagram of a receive weight adjuster according to an embodiment of the present invention.

The array antenna 101 includes the N receive array elements, which are not shown in FIG. 1. Each receive array element may receive one received signal. The receive weight adjuster 107 may receive the N received signals from the N receive array elements, and separately perform receive weight adjustment on the N received signals according to a receive weight adjustment coefficient, to obtain N received signals after the receive weight adjustment. The receive weight adjuster 107 performs weighting on analog signals on multiple channels, where a phase and/or amplitude may be adjusted. For example, as shown in FIG. 2, a phase shifter 201 and an adjustable amplifier 202 may be included, where the phase shifter 201 adjusts phases of the N received signals, and the adjustable amplifier 202 adjusts amplitude of the N received signals. Certainly, either one of the phase shifter 201 and the adjustable amplifier 202 may be merely included.

The combiner 106 is configured to receive the N received signals obtained after the receive weight adjustment, and combine the N received signals obtained after the receive weight adjustment, to obtain a combined received signal.

The analog-to-digital conversion and baseband processor 105 is configured to receive the combined received signal, and perform analog-to-digital conversion and baseband processing on the combined received signal. Because baseband processing needs to be performed, the analog-to-digital conversion needs to adapt to a rate and a bandwidth of a normal communication signal, to complete high-performance analog-to-digital conversion processing. The analog-to-digital conversion and baseband processor does not need to perceive a beam control function.

The N anti-aliasing filters 112 are configured to separately receive one signal that is coupled from each of the N received signals obtained after the receive weight adjustment, and separately perform anti-aliasing processing on the N coupled signals, to obtain N signals after the anti-aliasing processing. Only a part of signals are coupled, and receiving processing on a signal combined by the combiner is not affected.

The anti-aliasing filter 112 performs anti-aliasing filtering on a coupled signal, to adapt to subsequent low-rate analog-to-digital conversion sampling. The working principle of the anti-aliasing filter may be represented as:

$$SF_i(f) = AAF_i(f) \cdot S_i(f), \quad i=1,2,\ldots,N$$

where $S_i(f)$ is a frequency spectrum of a coupled signal corresponding to the $i^{th}$ receive channel; $SF_i(f)$ is a frequency spectrum of a signal filtered and output by the $i^{th}$ AAF; $AAF_i(f)$ represents a frequency domain response of the $i^{th}$ AAF filter, $AAF_i(f)$ has an attribute of low-pass filtering, and may limit the bandwidth of an input signal to a degree that matches a sampling rate of the low-rate analog-to-digital converter; and N represents a quantity of receive channels.

The N low-rate analog-to-digital converters 111 are configured to separately receive the N signals obtained after the anti-aliasing processing, and separately perform low-rate analog-to-digital conversion, to obtain N digital signals, where the output N signals may also be referred to as N sub-sampling signals. The N low-rate analog-to-digital converters, driven by a same sampling clock signal, perform low-rate sampling on a signal.

The low-rate analog-to-digital converter 111 is a low-rate small bandwidth analog-to-digital converter. After sampling an analog signal, the low-rate analog-to-digital converter converts a sampled analog signal into a low-rate digital signal, and outputs the low-rate digital signal to the sampling phase adjuster. A working principle of the low-rate analog-to-digital converter may be represented as:

$$SS_i(n) = \delta_i(t-nT) \cdot SF_i(t) = \delta(t-nT+\sigma_i) \cdot SF_i(t) = SF_i(n-\sigma_i),$$
$$i=1,2,\ldots,N$$

A frequency domain response of the low-rate analog-to-digital converter is represented as $SS_i(w) = SF_i(w) \cdot e^{(j) \cdot \varphi_i}$, where t represents a time variable of a continuous signal, n represents a time variable of a discrete signal, w represents a frequency variable of the discrete signal, (j) represents an imaginary part $j = \sqrt{-1}$ of a complex number, $SF_i(t)$ is a continuous signal output by the $i^{th}$ AAF filter, $SS_i(n)$ is a discrete signal obtained after sampling of the $i^{th}$ low-rate analog-to-digital converter, $\delta_i(t-nT)$ is a sampling function of the $i^{th}$ low-rate analog-to-digital converter, $\delta(t-nT)$ represents a sampling function of an ideal low-rate analog-to-digital converter, T represents a sampling cycle of the low-rate analog-to-digital converter, $\sigma_i$ is a sampling delay of the $i^{th}$ low-rate analog-to-digital converter, $\varphi_i$ is a phase offset caused by the sampling delay of the $i^{th}$ low-rate analog-to-digital converter, $SF_i(w)$ represents an input frequency domain signal of the $i^{th}$ low-rate analog-to-digital converter, and $SS_i(w)$ represents a frequency domain signal obtained after sampling of the $i^{th}$ low-rate analog-to-digital converter.

The sampling phase adjuster 110 is configured to receive the N digital signals, perform delay compensation on the N digital signals according to a phase deviation between the N low-rate analog-to-digital converters, to obtain N digital signals whose sampling phases are aligned, and send the N digital signals obtained after the sampling phase alignment to the spatial filter.

N sub-sampling signals are simultaneously input into a sampling phase adjuster, to obtain N sub-sampling signals after the sampling phase alignment. The sampling phase adjuster performs delay compensation on the N sub-sampling signals according to a sampling phase deviation of the N low-rate analog-to-digital converters, and aligns sampling time of N signals to eliminate the sampling phase deviation. The sampling phase adjuster may acquire the sampling phase deviation of the N low-rate analog-to-digital converters by means of estimation in a manner of sending a training signal in an offline or online state.

The sampling phase adjuster 110 is configured to compensate the sampling phase deviation caused by differences in phases of a driving clock exist when multiple low-rate analog-to-digital converters perform sampling. A working principle is represented as the following formula:

$$\begin{bmatrix} SA_1(w) \\ SA_2(w) \\ \vdots \\ SA_N(w) \end{bmatrix} = \begin{bmatrix} 1 & 0 & \cdots & 0 \\ 0 & e^{-(j) \cdot \Delta\varphi_2} & & 0 \\ \vdots & & \ddots & \vdots \\ 0 & 0 & \cdots & e^{-(j) \cdot \Delta\varphi_N} \end{bmatrix} \cdot \begin{bmatrix} SS_1(w) \\ SS_2(w) \\ \vdots \\ SS_N(w) \end{bmatrix} =$$

$$\begin{bmatrix} SF_1(w) \\ SF_2(w) \\ \vdots \\ SF_N(w) \end{bmatrix} \cdot e^{(j) \cdot \varphi_1}, \Delta\varphi_i = \varphi_i - \varphi_1$$

where $SF_i(w)$ represents an input frequency domain signal of the $i^{th}$ low-rate analog-to-digital converter, $SS_i(w)$ represents a frequency domain signal obtained after sampling of the $i^{th}$ low-rate analog-to-digital converter samples, $SA_i(w)$ represents a frequency domain signal that is obtained after sampling phase adjustment is performed on a frequency domain signal obtained after the sampling of the $i^{th}$ low-rate analog-to-digital converter, and $\Delta\varphi_i$ is a sampling phase difference between the $i^{th}$ low-rate analog-to-digital converter and the first low-rate analog-to-digital converter.

A vector formed by N sampling signals is input into the sampling phase adjuster, and the sampling phase adjuster outputs N sampling signals obtained after the phase alignment.

Certainly, in another embodiment, the sampling phase adjuster may not be included.

The spatial filter 109 is configured to receive the N digital signals, and perform spatial filtering on the N digital signals according to a spatial filtering coefficient, to obtain N signals after the spatial filtering.

The spatial filter 109 in this embodiment of the present invention may be a selective spatial filter, and may perform selective spatial filtering on multiple signals obtained after sampling by the low-rate analog-to-digital converter.

A principle of the spatial filtering may be:

$$SO = \begin{bmatrix} so_1(n) \\ so_2(n) \\ \vdots \\ so_N(n) \end{bmatrix} = W \odot SA = \begin{bmatrix} w_1(n) \\ w_2(n) \\ \vdots \\ w_N(n) \end{bmatrix} \odot \begin{bmatrix} SA_1(n) \\ SA_2(n) \\ \vdots \\ SA_N(n) \end{bmatrix} = \begin{bmatrix} w_1(n) \cdot SA_1(n) \\ w_2(n) \cdot SA_2(n) \\ \vdots \\ w_N(n) \cdot SA_N(n) \end{bmatrix}$$

where $so_i(n)$ represents the $i^{th}$ signal obtained after the spatial filtering, $SA_i(n)$ represents the $i^{th}$ input digital signal, $w_i(n)$ represents the $i^{th}$ spatial filtering coefficient, and $\odot$ represents a Hadamard product, that is multiplying corresponding elements of a vector or a matrix.

The spatial filter 109 performs updating according to feedback of the signal optimizer. An updating principle is as follows:

$$W(n) = \begin{cases} W(n-1) & , \text{if } sel(n-1) = 0 \\ W(n-1) + \mu \cdot e(n-1) \cdot (SA(n-1)^*) & , \text{if } sel(n-1) = 1 \end{cases}$$

$$sel(n) = \begin{cases} 1, \text{if } \sum_i (|SA_i(n)| > Thr) > N/2 \\ 0, \text{if } \sum_i (|SA_i(n)| > Thr) > N/2 \end{cases}$$

where W is a spatial filtering coefficient; μ is a step parameter when a weight is updated; e is a weight updating parameter fed back by the signal optimizer; sel is a sampling point selection parameter, where when a mid-value of a vector module value of an input sample is greater than some threshold Thr, it is determined that the sample is a valid sample, and when it is determined that the sample is a valid sample, the spatial filtering coefficient is updated; and * represents obtaining a conjugate of a signal.

The spatial filtering coefficient includes weight coefficients of N complex numbers, where initial values thereof may all be set to 1. N sampling signals input simultaneously are viewed as a sampling point vector. A mid-value of amplitude of N elements is calculated for each input sampling point vector, and a sampling point vector whose mid-value is greater than some threshold is used as a valid vector. After the valid vector is weighted through N spatial filtering weight coefficients, N valid signals after the spatial filtering are obtained, and are output to the signal optimizer from the selective spatial filter. The spatial filter receives an adjustment coefficient of the spatial filtering coefficient obtained from the signal optimizer, and amends the weight coefficients, of N complex numbers, in the spatial filtering coefficient according to the adjustment coefficient.

The signal optimizer 108 is configured to receive the N signals obtained after the spatial filtering, obtain an adjustment coefficient of the spatial filtering coefficient according to the N signals obtained after the spatial filtering, and send the adjustment coefficient of the spatial filtering coefficient to the spatial filter.

The signal optimizer 108 performs signal to noise ratio or signal to interference ratio estimation on a superposed signal output by the spatial filter. By collecting statistics on self-correlation and cross-correlation of a signal, an updating direction of a filtering coefficient vector of the spatial filter is acquired, and a coefficient for adjusting the spatial filter is fed back, so as to maximize a signal to noise ratio or signal to interference ratio of a filtered signal.

The following gives a principle that the signal optimizer drives updating of the spatial filtering coefficient:

$$e(n) = \begin{cases} 1, & \text{if } C(n) > C(n-1) \\ -1, & \text{if } C(n) \Leftarrow C(n-1). \end{cases}$$

The signal optimizer 108 receives the N signals obtained after the spatial filtering, and outputs a parameter signal that is updated by the spatial filter, where C represents an optimization criterion of the optimizer. For example, to improve a power of a received signal, C is represented as:

$$C(n) = \sum_i |so_i(n)|^2.$$

The receive weight decision device 114 is configured to receive the spatial filtering coefficient, determine the receive weight adjustment coefficient according to the spatial filtering coefficient, and send the receive weight adjustment coefficient to the receive weight adjuster.

The receive weight decision device 114 receives a coefficient of the spatial filter, determines the receive weight adjustment coefficient by extracting a phase and amplitude of the coefficient of the filter, and adjusts a phase and amplitude of the received signal, so that a receiving beam can optimize quality of the received signal. Preferably, synchronization adjustment may be performed on the receive weight adjuster 107 according to a clock of signal processing.

The baseband processing and digital-to-analog converter 104 is configured to perform baseband processing and digital-to-analog conversion on a transmit signal, and send one transmit signal obtained after the digital-to-analog conversion to the splitter.

The splitter 103 is configured to receive the one transmit signal, and split the one transmit signal into M signals, to obtain M transmit signals.

The transmit weight adjuster 102 is configured to receive the M transmit signals, perform transmit weight adjustment on the M transmit signals according to a transmit weight adjustment coefficient, to obtain M transmit signals after the transmit weight adjustment, and separately send, by using M transmit array elements, the M transmit signals obtained after the transmit weight adjustment.

The transmit weight decision device 113 is configured to receive the spatial filtering coefficient, determine an angle of arrival of the received signal according to the spatial filtering coefficient, and determine the transmit weight adjustment coefficient according to the angle of arrival.

First, a feature vector about a space angle of a receive array is calculated in advance according to an array parameter of a receive array. Using an array having a linear arrangement as an example, the feature vector is:

$$A(\theta) = \begin{bmatrix} 1 \\ e^{-j\frac{2\pi}{\lambda}d\cdot\cos(\theta)} \\ \vdots \\ e^{-j(N-1)\frac{2\pi}{\lambda}d\cdot\cos(\theta)} \end{bmatrix},$$

where $\lambda$ is a wave length of a signal carrier, and d is spacing between array elements.

For a receive array whose array feature vector is $A(\theta)$, when a beam whose angle of arrival is $\theta_{in}$ is incident to the array, a signal R received on the array may be represented as:

$$R(n) = A(\theta_{in}) \cdot s(n) = \begin{bmatrix} a_1(\theta_{in}) \\ a_2(\theta_{in}) \\ \vdots \\ a_N(\theta_{in}) \end{bmatrix} \cdot s(n).$$

It can be known from the principle of spatial filtering that a signal that is obtained after spatial filtering is performed on the signal R received on the array is:

$$SO = \begin{bmatrix} so_1(n) \\ so_2(n) \\ \vdots \\ so_N(n) \end{bmatrix} = W \odot R(n) = \begin{bmatrix} w_1(n) \cdot a_1(\theta_{in}) \\ w_2(n) \cdot a_2(\theta_{in}) \\ \vdots \\ w_N(n) \cdot a_N(\theta_{in}) \end{bmatrix} \cdot s(n).$$

When a synthetic received power reaches the maximum, after the spatial filter is convergent, $W=A(\theta_{in})^*$.

In a practical system, a coefficient vector W of the spatial filter is input into the transmit weight decision device, and the coefficient vector W is disassembled to obtain:

$$W = \alpha_1 \cdot A(\theta_1)^* + \alpha_2 \cdot A(\theta_2)^* + \ldots.$$

At this moment, an angle corresponding to a largest value of a selective coefficient $\alpha$ is used as the angle of arrival, that is, $\theta_m$ is chosen as the output angle of arrival. At this moment, $$m = \max_i \{\alpha_i\}.$$

That is, the feature vector, about the space angle, of the receive array is obtained in advance through calculation according to the array parameter of the receive array, and then, an angle of arrival corresponding to a strongest plane wave component in the received signal is estimated by calculating a largest component that is obtained by disassembling the coefficient of the spatial filter on the feature vector of the receive array.

The transmit weight decision device 113 generates a transmit array weight coefficient according to the feature vector of the transmit array by using the angle of arrival that is obtained through estimation.

That is, a weight vector $W_{tx}=A_{tx}(\theta_m)^*$ is generated in accordance with the feature vector of the transmit array according to the input angle of arrival $\theta_m$. The feature vector of the transmit array may be acquired in a manner the same as a manner of acquiring the feature vector of the receive array.

The transmit weight adjustment coefficient is adjusted according to the transmit array weight coefficient.

In this embodiment of the present invention, the beam adjustment apparatus for an array antenna 101 couples N received signals before combination and analog-to-digital conversion, performs low-rate small bandwidth analog-to-digital conversion on the N received signals, performs spatial filtering on signals obtained after the analog-to-digital conversion, adjusts a filtering coefficient, and adjusts a weight of the received signal according to the filtering coefficient, so as to adjust a receiving beam. In this embodiment of the present invention, beam control is performed according to the N received signals, so that a speed and flexibility of the beam control are greatly improved; no baseband processing needs to be performed on a signal obtained after analog-to-digital conversion of the low-rate analog-to-digital converter, so that a requirement on performance of the analog-to-digital converter is low, and costs are not high.

Figure 3:
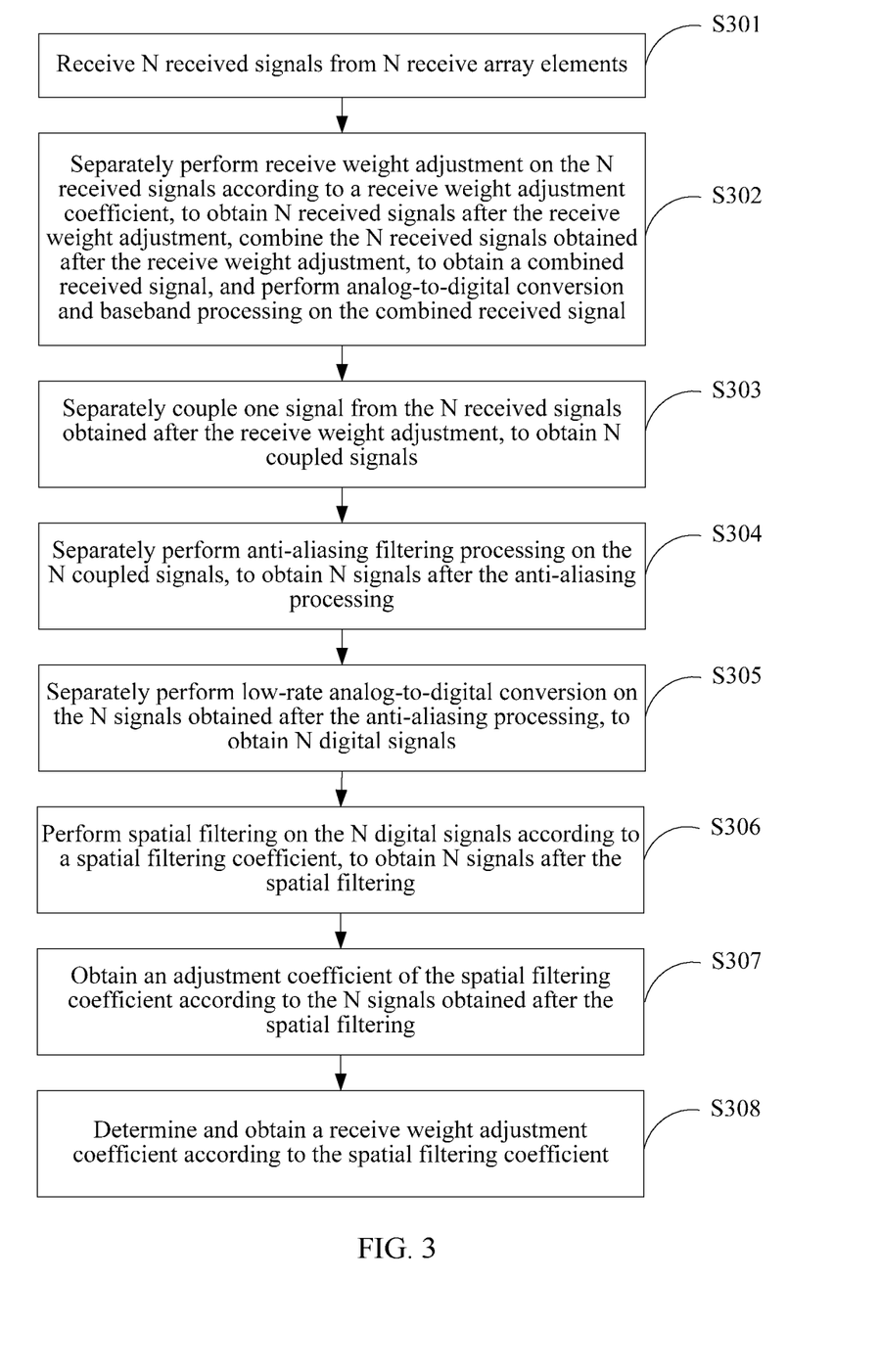
FIG. 3 is a flowchart of a beam adjustment method for an array antenna according to an embodiment of the present invention.

As shown in FIG. 3, a flowchart of a beam adjustment method for an array antenna is provided. The array antenna includes N receive array elements, and the method includes:

S301: Receive N received signals from the N receive array elements.

S302: Separately perform receive weight adjustment on the N received signals according to a receive weight adjustment coefficient, to obtain N received signals after the receive weight adjustment, combine the N received signals obtained after the receive weight adjustment, to obtain a combined received signal, and perform analog-to-digital conversion and baseband processing on the combined received signal.

S303: Separately couple one signal from the N received signals obtained after the receive weight adjustment, to obtain N coupled signals.

S304: Separately perform anti-aliasing filtering processing on the N coupled signals, to obtain N signals after the anti-aliasing processing.

S305: Separately perform low-rate analog-to-digital conversion on the N signals obtained after the anti-aliasing processing, to obtain N digital signals.

S306: Perform spatial filtering on the N digital signals according to a spatial filtering coefficient, to obtain N signals after the spatial filtering.

S307: Obtain an adjustment coefficient of the spatial filtering coefficient according to the N signals obtained after the spatial filtering.

S308: Determine the receive weight adjustment coefficient according to the spatial filtering coefficient.

Before step S306, the method may further include:

performing delay compensation on the N digital signals according to a sampling phase deviation between analog-to-digital conversion of the N coupled signals, to obtain N digital signals whose sampling phases are aligned.

The obtaining an adjustment coefficient of the spatial filtering coefficient according to the N signals obtained after the spatial filtering in step S307 may include:

calculating signal to noise ratios or signal to interference ratios of the N signals obtained after the spatial filtering, and obtaining the adjustment coefficient of the spatial filtering coefficient according to a calculation result, so as to increase the signal to noise ratios or the signal to interference ratios of the N signals obtained after the spatial filtering.

The determining a receive weight adjustment coefficient according to the spatial filtering coefficient in step S308 may include:

calculating a phase or amplitude of the spatial filtering coefficient, to obtain the receive weight adjustment coefficient.

The array antenna further includes M transmit array elements, a transmit signal obtained after baseband processing and digital-to-analog conversion is split into M transmit signals, transmit weight adjustment is performed on the M transmit signals according to a transmit weight adjustment coefficient, to obtain M transmit signals after the transmit weight adjustment, and the M transmit signals obtained after the transmit weight adjustment are separately transmitted by using the M transmit array elements, and the method may further include:

determining an angle of arrival of a received signal according to the spatial filtering coefficient, and determining a transmit weight adjustment coefficient according to the angle of arrival.

The receive weight adjustment coefficient includes one or more of a phase and amplitude, and the transmit weight adjustment coefficient includes one or more of a phase and amplitude.

A person skilled in the art may clearly understand that, for convenience and simplicity of the description, cross reference may be made between the apparatus, component, and method described above.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

What is claimed is:

1. A beam adjustment apparatus for an array antenna comprising N receive array elements, wherein N is an integer greater than or equal to 1, and the beam adjustment apparatus comprises:

a receive weight adjuster configured to receive N received signals from the N receive array elements, and perform receive weight adjustment on the N received signals according to a receive weight adjustment coefficient to obtain N received signals after the receive weight adjustment;

a combiner configured to receive the N received signals obtained after the receive weight adjustment, and combine the N received signals obtained after the receive weight adjustment, to obtain a combined received signal;

an analog-to-digital conversion and baseband processor configured to receive the combined received signal, and perform analog-to-digital conversion and baseband processing on the combined received signal;

N anti-aliasing filters configured to separately receive one signal that is coupled from each of the N received signals obtained after the receive weight adjustment, and separately perform anti-aliasing processing on each of the N coupled signals to obtain N anti-aliased signals;

N analog-to-digital converters configured to receive the N anti-aliased signals and perform analog-to-digital conversion to obtain N digital signals;

a spatial filter configured to receive the N digital signals, and perform spatial filtering on the N digital signals according to a spatial filtering coefficient, to obtain N spatially filtered signals; and a signal optimizer configured to
 a) receive the N spatially filtered signals,
 b) obtain an adjustment coefficient of the spatial filtering coefficient according to the N spatially filtered signals, and
 c) send the adjustment coefficient of the spatial filtering coefficient to the spatial filter, and wherein the receive weight adjustment coefficient is determined according to the spatial filtering coefficient.

2. The apparatus according to claim 1, further comprising:
a sampling phase adjuster between the N low-rate analog-to-digital converters and the spatial filter, wherein the sampling phase adjuster is configured to:
 a) receive the N digital signals;
 b) perform delay compensation on the N digital signals according to a sampling phase deviation between the N low-rate analog-to-digital converters;
 c) obtain N digital signals whose sampling phases are aligned; and
 d) send the N digital signals whose sampling phases are aligned to the spatial filter.

3. The apparatus according to claim 1, wherein the signal optimizer is further configured to:
calculate signal-to-noise ratios or signal-to-interference ratios of the N signals obtained after the spatial filtering; and
obtain the adjustment coefficient of the spatial filtering coefficient according to a calculation result, so as to increase the signal-to-noise ratios or the signal-to-interference ratios of the N signals obtained after the spatial filtering.

4. The apparatus according to claim 1, wherein a phase or amplitude of the spatial filtering coefficient is calculated to obtain the receive weight adjustment coefficient.

5. The apparatus according to claim 1, wherein
the array antenna further comprises M transmit array elements, wherein M is an integer greater than or equal to 1, and
the adjustment apparatus further comprises a baseband processing and digital-to-analog converter, a splitter, and a transmit weight adjuster, and a transmit weight decision device, wherein
 a) the baseband processing and digital-to-analog converter is configured to perform baseband processing and digital-to-analog conversion on a transmit signal, and send one transmit signal obtained after the digital-to-analog conversion to the splitter;
 b) the splitter is configured to receive the one transmit signal, and split the one transmit signal into M signals, to obtain M transmit signals; and
 c) the transmit weight adjuster is configured to receive the M transmit signals, perform transmit weight adjustment on each of the M transmit signals according to a transmit weight adjustment coefficient, to obtain M adjusted transmit signals after the transmit weight adjustment, and separately send, by using the M transmit array elements, the M adjusted transmit signals obtained after the transmit weight adjustment, and wherein
the transmit weight adjustment coefficient is determined according to an angle of arrival of one of the N received signals determined based on the spatial filtering coefficient.

6. The apparatus according to claim 5, wherein the receive weight adjustment coefficient comprises at least one of a phase and amplitude, and the transmit weight adjustment coefficient comprises at least one of a phase and amplitude.

7. A beam adjustment method for an array antenna comprising N receive array elements, wherein N is an integer greater than or equal to 1, and the method comprises:
receiving N received signals from the N receive array elements;
separately performing receive weight adjustment on the N received signals according to a receive weight adjustment coefficient to obtain N weight adjusted signals;
combining the N weight adjusted received signals to obtain a combined received signal, and performing analog-to-digital conversion and baseband processing on the combined received signal;
obtaining N coupled signals from the N weight adjusted signals;
performing anti-aliasing filtering processing on the N coupled signals to obtain N anti-aliased signals;
performing analog-to-digital conversion on the N anti-aliased signals to obtain N digital signals;
performing spatial filtering on the N digital signals according to a spatial filtering coefficient to obtain N spatially filtered signals;
obtaining an adjustment coefficient of the spatial filtering coefficient according to the N spatially filtered signals; and
determining the receive weight adjustment coefficient according to the spatial filtering coefficient.

8. The method according to claim 7, wherein before performing spatial filtering on the N digital signals according to the spatial filtering coefficient, the method further comprises:
performing delay compensation on the N digital signals according to a sampling phase deviation between analog-to-digital conversion of the N coupled signals to obtain N digital signals whose sampling phases are aligned.

9. The method according to claim 7, wherein obtaining the adjustment coefficient of the spatial filtering coefficient according to the N signals obtained after the spatial filtering comprises:
calculating signal-to-noise ratios or signal-to-interference ratios of each of the N signals obtained after the spatial filtering, and
obtaining the adjustment coefficient of the spatial filtering coefficient according to a calculation result, so as to increase the signal-to-noise ratios or the signal-to-interference ratios of the N signals obtained after the spatial filtering.

10. The method according to claim 7, wherein determining the receive weight adjustment coefficient according to the spatial filtering coefficient comprises:
calculating a phase or amplitude of the spatial filtering coefficient to obtain the receive weight adjustment coefficient.

11. The method according to claim 7, wherein the array antenna further comprises M transmit array elements and the method further comprises:
obtaining a transmit signal after baseband processing and digital-to-analog conversion is split into M transmit signals;
performing transmit weight adjustment on the M transmit signals according to a transmit weight adjustment coefficient to obtain M transmit signals after the transmit weight adjustment;
separately transmitting the M transmit signals obtained after the transmit weight adjustment by using the M transmit array elements, wherein M is an integer greater than or equal to 1;
determining an angle of arrival of one of the N received signals according to the spatial filtering coefficient; and
determining the transmit weight adjustment coefficient according to the angle of arrival.

12. The method according to claim 11, wherein the receive weight adjustment coefficient comprises at least one of a phase and amplitude, and the transmit weight adjustment coefficient comprises at least one of a phase and amplitude.

13. A beam adjustment apparatus for an array antenna comprising N receive array elements, wherein N is an integer greater than or equal to 1, and the beam adjustment apparatus comprises:
a receive weight adjuster configured to perform weight adjustment on each of N received signals from the N receive array elements according to a weight adjustment coefficient to obtain N weight adjusted signals;
N anti-aliasing filters for performing anti-aliasing filtering on N coupled signals to obtain N anti-aliased signals, where the N coupled signals are derived from the N weight adjusted signals;
N analog-to-digital converters for performing analog-to-digital conversion on the N anti-aliased signals to obtain N digital signals;
a spatial filter for performing spatial filtering on the N digital signals according to a spatial filtering coefficient to obtain N spatially filter signals;
a signal optimizer configured to
a) receive the N spatially filtered signals
b) obtain an adjustment coefficient of the spatial filtering coefficient according to the N spatially filtered signals, and
c) send the adjustment coefficient of the spatial filtering coefficient to the spatial filter, and wherein the receive weight adjustment coefficient is determined according to the spatial filtering coefficient.

14. The apparatus according to claim 13, further comprising:
a sampling phase adjuster between the N analog-to-digital converters and the spatial filter, wherein the sampling phase adjuster is configured to:
a) receive the N digital signals;
b) perform delay compensation on the N digital signals according to a sampling phase deviation between the N analog-to-digital converters;
c) obtain N digital signals whose sampling phases are aligned; and
d) send the N digital signals whose sampling phases are aligned to the spatial filter.

15. The apparatus according to claim 13, wherein the signal optimizer is further configured to:
calculate signal-to-noise ratios or signal-to-interference ratios of the N spatial filtered signals obtained after the spatial filtering; and
obtain the adjustment coefficient of the spatial filtering coefficient according to a calculation result, so as to increase the signal-to-noise ratios or the signal-to-interference ratios of the N spatially filtered signals.

16. The apparatus according to claim 13, wherein the array antenna further comprises M transmit array elements, wherein M is an integer greater than or equal to 1, and the adjustment apparatus further comprises a baseband processing and digital-to-analog converter, a splitter, and a transmit weight adjuster, wherein
a) the baseband processing and digital-to-analog converter is configured to (a) perform baseband processing and digital-to-analog conversion on a transmit signal, and (b) send one transmit signal obtained after the digital-to-analog conversion to the splitter;
b) the splitter is configured to receive the one transmit signal, and split the one transmit signal into M signals, to obtain M transmit signals; and
c) the transmit weight adjuster is configured to (a) receive the M transmit signals, (b) perform transmit weight adjustment on each of the M transmit signals according to a transmit weight adjustment coefficient to obtain M adjusted transmit signals after the transmit weight adjustment, and (c) separately send, by using the M transmit array elements, the M adjusted transmit signals obtained after the transmit weight adjustment; and
wherein
the transmit weight adjustment coefficient is determined according to an angle of arrival of one of the N received signals determined based on the spatial filtering coefficient.

17. The apparatus according to claim 16, wherein the weight adjustment coefficient comprises at least one of a phase and amplitude, and the transmit weight adjustment coefficient comprises at least one of a phase and amplitude.

* * * * *